(12) United States Patent
Thompson

(10) Patent No.: US 7,462,120 B1
(45) Date of Patent: Dec. 9, 2008

(54) WARPED CHAIN RING GEAR USED IN A BICYCLE CHAIN TRANSFER

(76) Inventor: Scott C. Thompson, 2424 W. 37th Ave., Denver, CO (US) 80211

(*) Notice: Subject to any disclaimer, the term of this patent is extended or adjusted under 35 U.S.C. 154(b) by 574 days.

(21) Appl. No.: 11/049,512

(22) Filed: Feb. 3, 2005

(51) Int. Cl.
*F16H 55/12* (2006.01)
*F16H 55/30* (2006.01)

(52) U.S. Cl. .................. 474/160; 474/152

(58) Field of Classification Search .......... 474/160, 474/164, 152, 158, 148
See application file for complete search history.

(56) References Cited

U.S. PATENT DOCUMENTS

| | | | | |
|---|---|---|---|---|
| 4,181,033 A | * | 1/1980 | Nagano | 474/156 |
| 4,380,445 A | * | 4/1983 | Shimano | 474/144 |
| 4,642,075 A | * | 2/1987 | Nagashima | 474/160 |
| 5,205,794 A | * | 4/1993 | Browning | 474/160 |
| 5,480,359 A | * | 1/1996 | Tani | 474/160 |
| 5,935,033 A | * | 8/1999 | Tseng et al. | 474/160 |
| 5,954,604 A | * | 9/1999 | Nakamura | 474/160 |
| 6,203,462 B1 | * | 3/2001 | Takamori | 474/161 |
| 6,293,884 B1 | * | 9/2001 | Chattin | 474/160 |
| 6,475,110 B1 | * | 11/2002 | Yamanaka | 474/152 |
| 6,860,171 B1 | * | 3/2005 | Nanko et al. | 74/594.1 |
| 2002/0028719 A1 | * | 3/2002 | Yamanaka | 474/160 |
| 2003/0073531 A1 | * | 4/2003 | Tseng | 474/160 |
| 2005/0039570 A1 | * | 2/2005 | Nanko et al. | 74/594.1 |
| 2005/0090349 A1 | * | 4/2005 | Lee | 474/160 |
| 2006/0094550 A1 | * | 5/2006 | Tetsuka | 474/160 |

* cited by examiner

*Primary Examiner*—Robert A Siconolfi
*Assistant Examiner*—Thomas W Irvin
(74) *Attorney, Agent, or Firm*—Edwin H. Crabtree; Ramon L. Pizarro

(57) ABSTRACT

A chain ring gear set adapted for attaching to spider arms. The spider arms are attached to and extend outwardly from a bicycle gear crank. The ring gear set is adapted for receiving a bicycle chain thereon. The chain is transferred on the ring gear set using a chain derailer. The ring gear set includes a first ring gear disposed next to an adjacent second ring gear in a spaced relationship. A portion of the first ring gear is warped toward the second ring gear for periodically reducing the distance between a perimeter of the first ring gear to a perimeter of the second ring gear. Also, a portion of the second ring gear can be warped toward the first ring gear for sharing or combining the amount of warpage in each gear for reduced chain wear. By indexing the warped portion of the first ring gear with the warped portion of the second ring gear the overall distance periodically is reduced for ease in a smooth chain transfer between the gears.

18 Claims, 2 Drawing Sheets

WARPED CHAIN RING GEAR USED IN A BICYCLE CHAIN TRANSFER

BACKGROUND OF THE INVENTION (a) Field of the Invention

This invention relates to bicycle chain ring gears and the transfer of a bicycle chain from one gear to another and more particularly, but not by way of limitation, to a chain ring gear set where one or more of the ring gears is warped for a gradual and fluid lateral transfer of a bicycle chain from one chain ring gear to another chain ring gear in the ring gear set. The bicycle chain is moved using a chain derailer during the operation of the bicycle.

(b) Discussion of Prior Art

Heretofore, there have been a variety of different types of eccentric or elliptical shaped chain ring gears used in ring gear sets on a bicycle. In U.S. Pat. No. 4,218,931 to Tritenne, a bicycle crank unit is disclosed having a chain wheel that is eccentric with a crank spindle. The crank spindle carries an external toothed pinion to engage an internal gear carried on the chain wheel. In U.S. Pat. No. 4,201,120 to Segawa, a gear crank for bicycles is described. The crank includes a crank shaft, a pair of crank arms and a chain gear. The chain gear includes convex and concave portions.

None of the above mentioned prior art patents specifically disclose the unique features, structure and function of the subject chain ring gear set where one or more of the ring gears include warped portions for periodically reducing the distance between the perimeters of adjacent ring gears for ease in chain transfer from one to another and using a bicycle chain derailer.

SUMMARY OF THE INVENTION

In view of the foregoing, it is a primary objective of the subject invention to provide a bicycle with a ring gear set which greatly improves lateral transfer of a bicycle chain from one ring gear to another. The invention can be used on both two and three ring gear sets.

Another object of the ring gear set is to provide one ring gear warped toward an adjacent ring gear for periodically reducing the total distance between the two perimeters of the two gears. Further, by warping the perimeters of adjacent gears toward each other, the amount of warping in any single gear is reduced to prevent excessive chain wear.

Yet another object of the invention is in a three ring chain gear set, a portion of all of the perimeters of the three gears can be warped for smooth lateral transfer of the chain between a large ring gear and a middle ring gear and between the middle ring gear and a small ring gear.

Still another object of the invention is the warped ring gear set can be used with road bikes, mountain bikes, racing bikes and other types of bikes using different types of ring gear sets. The invention can be used with any combination of ring gear sets. Also, the invention can be used with ring gears having any number of spider arms extending outwardly from a gear crank. Further, the warped ring gears can have various diameters for engaging the bicycle chain.

The warped chain ring gear set is adapted for attaching to spider arms extending outwardly from a bicycle gear crank, the ring gear set adapted for receiving a bicycle chain thereon, the chain transferred on the ring gear set using a chain derailer. The ring gear set includes a first ring gear disposed next to an adjacent second ring gear in a spaced relationship. A portion of the first ring gear is warped toward the second ring gear for reducing the distance periodically between the perimeter of the first ring gear to a perimeter of the second ring gear. Also, a portion of the perimeter of the second ring gear can be warped toward the warped portion in the perimeter of the first ring gear. By warping both gears toward each other, the amount of warping in any single gear is reduced.

These and other objects of the present invention will become apparent to those familiar with various types of bicycle ring gear sets and the use of a derailer in the transfer of a bicycle chain from one ring gear to another when reviewing the following detailed description, showing novel construction, combination, and elements as herein described, and more particularly defined by the claims, it being understood that changes in the various embodiments of invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
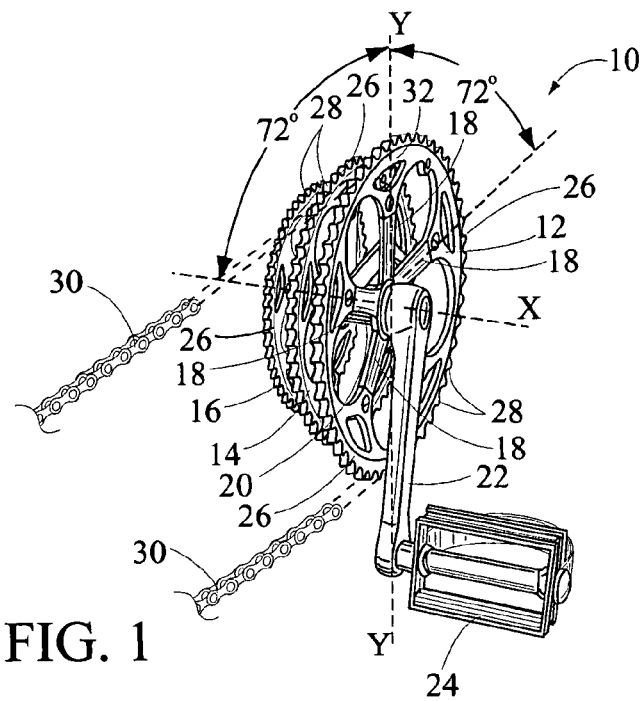
FIG. 1 is a perspective view of a three ring gear set attached to 5 spider arms extending outwardly from a gear crank on a bicycle. The set includes an outer large ring gear, a middle ring gear and an inner small ring gear. The large ring gear includes a 142 degree warped portion of a perimeter of the gear. The warped portion extends parabolically inwardly toward the middle ring gear.

In FIG. 1, the warped chain ring gear set is shown having a general reference numeral 10. In this example, the ring gear set 10 includes an outer large ring gear 12, a middle ring gear 14 and an inner small ring gear 16. The gears 12, 14 and 16 are disposed in a spaced relationship to each other and mounted along a vertical axis Y-Y. The three ring gears are adapted for attaching to spider arms 18 extending outwardly from a bicycle gear crank 20. The gear crank 20 is disposed along a horizontal axis X-X. An end of the gear crank 20 is attached to a crank arm 22 with an attached pedal 24. While the three ring gears are shown making up a front ring gear set for the bicycle, the subject invention can be used equally well with a combination of ring gear sets.

In this drawing, five spider arms 18 are shown attached to a perimeter 26 of the large ring gear 12. Only four of the five spider arms 18 can be seen in this perspective view of the ring gear set 10 with one of the spider arms 18 hidden behind the crank arm 22. The three ring gears 12, 14 and 16 include gear teeth 28 therearound and adapted for receiving a bicycle chain 30 thereon. The chain 30 has been cut away for ease in viewing the ring gear set 10. The chain 30 is transferred on the ring gear set 10 using a chain derailer when the rider of a bicycle wishes to upshift or downshift depending on various types of road grades and trail terrain. The complete bicycle and the chain derailer are not shown in the drawing.

It should be mentioned that while the ring gear set 10 illustrates three different size ring gears, the invention will work equally well with a ring gear set having any number of different sizes of ring gears. Also, the ring gear set 10 can be adapted for different types of road bikes, mountain bikes, racing bikes and the like and with the ring gears attached to any number of spider arms. Further, the ring gears can have various diameters and different numbers of gear teeth around the perimeters of the gears.

While it is not readily apparent in this drawing, a warped portion 32 on the perimeter 26 of the large ring gear 12 is deflected inwardly over a 144 degree arc of the perimeter 26 and between three of the spider arms 18 attached to the gear. Obviously, this key feature of warping a portion of the perimeter 26 of the ring gear 12 toward the perimeter 26 of the middle ring gear 14 reduces the distance between the perimeters 26 of the two gears approximately every second and ensures a practically instantaneous smooth and positive lateral transfer of the chain 30 when upshifting and downshifting during the operation of the bicycle. This deflecting or warping of the ring gear 12 is shown more clearly in FIGS. 2, 3 and 3A.

Figure 2:
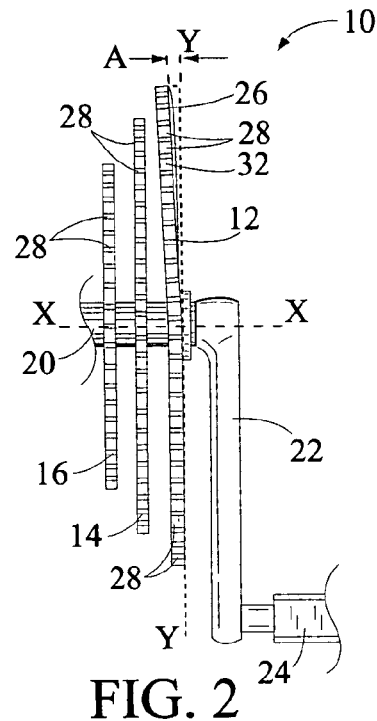
FIG. 2 is a side view of the three ring gear set shown in FIG. 1. In this view, the large ring gear is shown warped inwardly approximately ⅛ inch or 3 mm or a distance "A" at it's maximum deflection at a 12:00 o'clock position.

In FIG. 2, a side view of the three ring gear set 10 is shown. In this view, the perimeter 26 of the large ring gear 12 is shown warped inwardly approximately ⅛ inch or a distance "A". The maximum deflection is at a 12:00 o'clock position. While the distance "A" is mentioned being ⅛ inch, this distance can easily vary in a range of 1/16 to ¼ inches depending on the diameter of the ring gear and the spacing between the ring gears on the crank 20.

Figure 3:
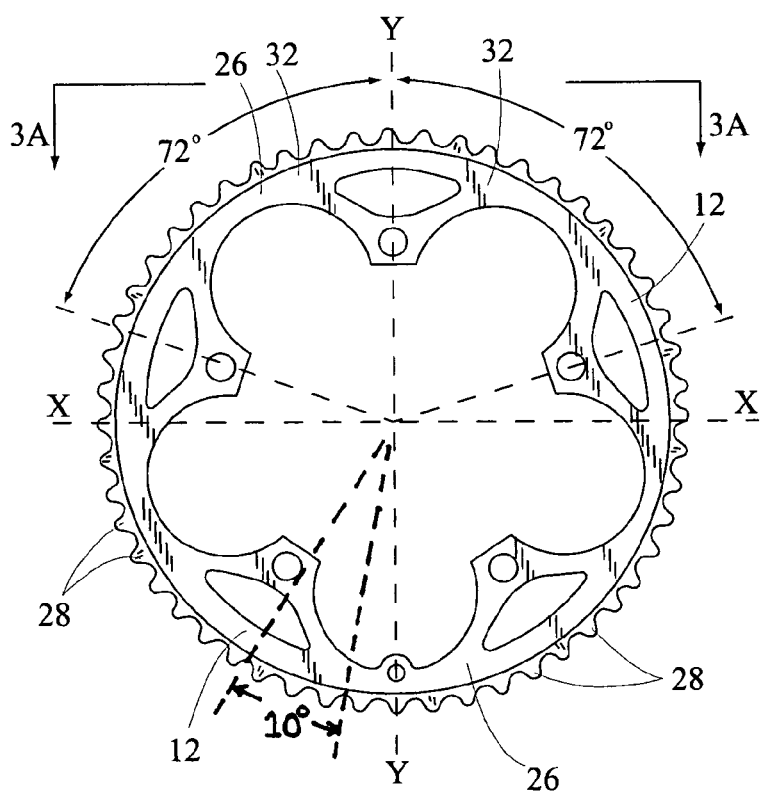
FIG. 3. is a front view of the large ring gear and detached from the spider arms. The ring gear is illustrated having a 142 degree deflection or warp of it's perimeter and starting at an approximate 9:30 o'clock position and extending upward and around to an approximate 2:30 o'clock position. The maximum deflection is at the 12:00 o'clock position. Also, a deflection of as little as 10 degrees is shown covering a space of three gear teeth.

In FIG. 3, a front view of the large outer ring gear 10 is illustrated and detached from the five spider arms 18. The ring gear 10, in this example, includes the 144 degree arc, which is warped or deflected starting at an approximate 9:30 o'clock position and extending upwardly and around to an approximate 2:30 o'clock position. The maximum deflection of the warped portion 32 is at a 12:00 o'clock position. While the warped portion 32 of the ring gear 12 is shown covering the 144 degree arc, it can be appreciated that the degree of arc of the warped portion 32 can cover a range of 10 to 360 degrees in the perimeter of the ring gear without departing from the spirit and scope of the invention. Also shown in this drawing and at a 7:00 o'clock position is the ring gear 12 with a 10 degree warp. For example, by warping three of the gear teeth 28, a small degree of arch of the warped portion 32 can be used for chain transfer. Obviously, the location of the warped portion 32 can be at any location on the ring gear 12 without departing from the spirit and scope of the invention.

Figure 3A:
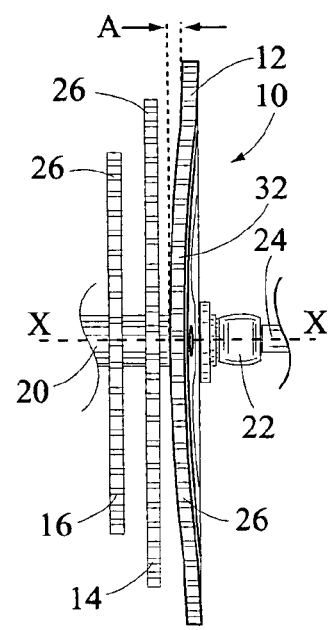
FIG. 3A is a top view of the three ring gear set shown in FIG. 1 and illustrating the gradual warping of the large ring gear starting at the 9:30 o'clock position and extending upwardly and around to the 2:30 o'clock position.

In FIG. 3A, a top view of the three ring gear set 10 is shown as illustrated in FIG. 1. In this drawing, the gradual warping of the warped portion 32 in the perimeter 26 of the large ring gear 12 can be seen starting at the 9:30 o'clock position and extending upwardly to the 12:00 o'clock position and then around to the 2:30 o'clock position. Obviously, a chain transfer is completed at the 12:00 o'clock position of the warped portion 32 when the perimeter of the large ring gear 12 is the closest to the perimeter of the middle ring gear 12.

Figure 4:
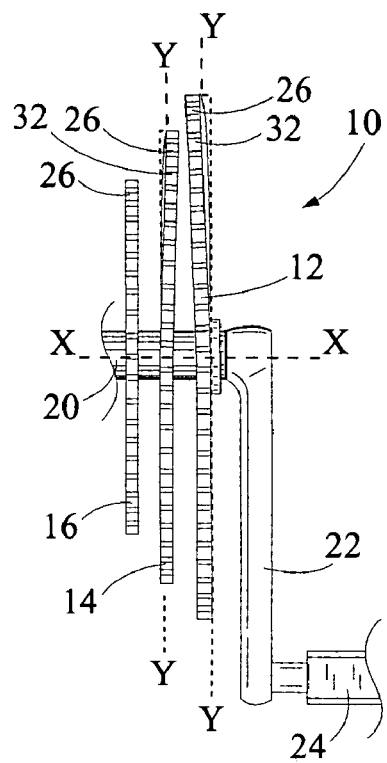
FIG. 4. is a side view of the three ring gear set similar to the ring gears shown in FIG. 2 but with a portion of the perimeters of both the large ring gear and the middle ring gear warped toward and indexed with each other for reducing the amount of warping that is required for a single warped gear to achieve the same transfer distance.

In FIG. 4, a side view of another embodiment of the three ring gear set 10 is shown and similar to the ring gears in FIG. 2. In this drawing, the warped portion 32 of the perimeter 26 the large ring gear 12 is warped inwardly toward the middle ring gear 14 and a warped portion 32 of the perimeter 26 of the middle ring gear 14 is warped outwardly toward the large ring gear 12. The two warped portions 32 of the gears 12 and 14 are indexed with each other. This feature provides for reducing the amount of warping in any single gear by having a shared or combined warping in both of the adjacent ring gears thereby reducing each gears warpage by one half. By having a portion of the perimeter of adjacent ring gears warped toward each other, excessive warping in a single gear is eliminated, which may cause chain wear.

For example, if the overall distance between the two gears 12 and 14 is ⅜ inches and it is desired to reduce the distance between the gears periodically by ⅛ inch, then only a maximum deflection of the warped portions 32 of each of the two gears 12 and 14 is 1/16 inch. The total shared or combined warpage between the two gears being a total of ⅛ inch. Therefore, having to warp a perimeter of a single gear ⅛ inch is not required, which as mentioned above can cause chain wear. Obviously, this feature allows for a minimum movement of the bicycle chain 30 with reduced chain and derailer wear and a straighter run of the chain when using the chain derailer for upshifting or downshifting. As mentioned above, the amount of warping or deflection of a portion of the chain gears and the distance between the chain gears on the crank can vary depending the bicycle manufacture, the type of bicycle and the design and diameter of the ring gear.

Figure 5:
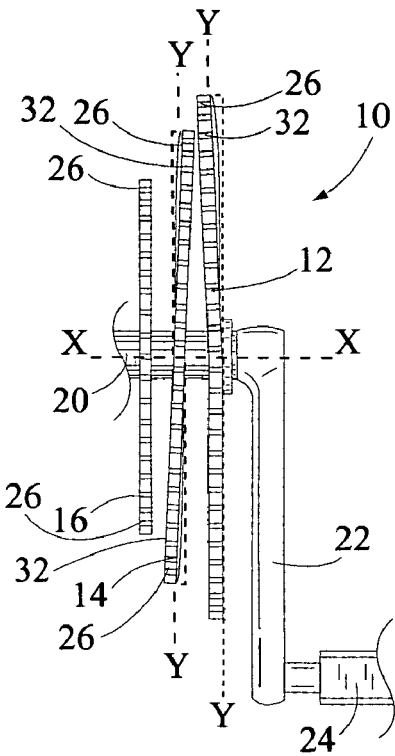
FIG. 5. is a side view of the three ring gear set similar to the ring gears shown in FIG. 4 but further including another warped portion in the perimeter of the middle ring gear and directed toward the perimeter of the small ring gear.

In FIG. 5, a side view of yet another embodiment of the three ring gear set 10 is illustrated and similar to the ring gears shown in FIG. 4. In this drawing, another warped portion 32 of the perimeter 26 of the middle ring gear 14 is warped inward toward the perimeter 26 of the small ring gear 16. This feature reduces the distance between the perimeters 26 of the middle ring gear 14 and the small ring gear 16, with only a single warpage in the middle ring gear. From reviewing this drawing, it can be seen that the middle ring gear 14 includes one warped portion 32 toward the large ring gear 12 and another warped portion 32 toward the small ring gear 16. The warped portions 32 on the middle ring gear 14 are disposed on opposite sides of the perimeter 26 of the gear.

Figure 6:
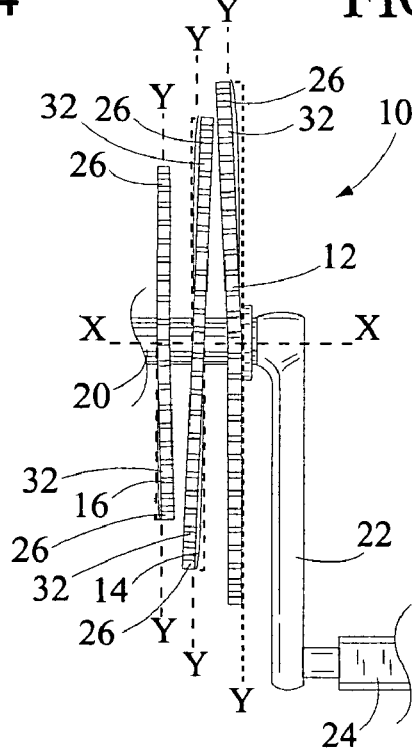
FIG. 6. is a side view of the three ring gear set similar to the ring gears shown in FIG. 5 but further including a portion of the perimeter of the small ring gear warped toward and indexed with the another warped portion in the perimeter of the middle ring gear. This allows the middle gear ring to sustain only one half the deflection vector when serving the small ring gear.

In FIG. 6, a side view of a yet another embodiment of the three ring gear set 10 is shown and similar to the ring gears shown in FIG. 5. In this drawing, a warped portion 32 of the perimeter 26 of the small ring gear 16 is warped inwardly toward and indexed with the another warped portion 26 in the perimeter 26 of the middle ring gear 14. The warping of a portion of the perimeter 26 of the small ring gear 16 outwardly and indexed with the warping of a portion of the perimeter 26 of the middle ring gear 14 inwardly further reduces the overall amount of warpage in each perimeter of the two gears. This combining or sharing of the warpage in both of the gears 14 and 16 provides for reduced chain wear and for ease in lateral transfer of the chain 30.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The invention claimed is:

1. A chain ring gear set adapted for attaching to spider arms, the spider arms disposed along a vertical axis, the spider arms attached to and extending outwardly from a bicycle gear crank, the bicycle gear crank disposed along a horizontal axis, the ring gear set is adapted for receiving a bicycle chain thereon, the chain transferred on the ring gear set using a chain derailleur, the ring gear set comprising: a first ring gear adapted for attachment to the spider arms, a radially outermost perimeter of said first ring gear having a first warped portion; and a second ring gear adapted for attachment to the spider arms, said second ring gear disposed in a spaced relationship to said first ring gear, said first warped portion of the radially outermost perimeter of said first ring gear extending parabolically toward a radial outermost perimeter of said second ring gear and at an angle to the vertical axis; whereby the first warped portion of the perimeter of said first ring gear reducing a horizontal distance periodically between the perimeter of said first ring gear and the perimeter of said second ring gear.

2. The ring gear set as described in claim 1 further including a second warped portion in the perimeter of said second ring gear and at angle to the vertical axis, said second warped portion extending toward and indexed with said first warped portion in the perimeter of said first ring gear for sharing the amount of warpage periodically between the perimeters of said first and second ring gears.

3. The ring gear set as described in claim 1 wherein said first warped portion in the perimeter of said first ring gear has an arc in a range of 10 to 360 degrees.

4. The ring gear set as described in claim 1 wherein said first warped portion in the perimeter of said first ring gear has an arc of at least 144 degrees.

5. The ring gear set as described in claim 2 wherein said second warped portion in the perimeter of said second ring gear has an arc in a range of 10 to 360 degrees.

6. The ring gear set as described in claim 2 wherein said second warped portion in the perimeter of said second ring gear has an arc of at least 144 degrees.

7. A chain ring gear set adapted for attaching to spider arms, the spider arms disposed along a vertical axis, the spider arms attached to and extending outwardly from a bicycle gear crank, the bicycle gear crank disposed along a horizontal axis, the ring gear set is adapted for receiving a bicycle chain thereon, the chain transferred on the ring gear set using a chain derailleur, the ring gear set comprising: a first ring gear adapted for attachment to the spider arms, a radially outermost perimeter of said first ring gear having a first warped portion at an angle to the vertical; a second ring gear adapted for attachment to the spider arms, a radially outermost perimeter of said second ring gear having a second warped portion at an angle to the vertical, said second ring gear disposed in a spaced relationship to said first ring gear, said first warped portion of the radially outermost perimeter of said first ring gear extending parabolically toward the radially outermost perimeter of said second ring gear and said second warped portion of the radially outermost perimeter of said second ring gear extending parabolically toward the radially outermost perimeter of said first ring gear, and a third ring gear adapted for attachment to the spider arms, said third ring gear disposed in a spaced relationship to said second ring gear; whereby the first warped portion of the radially outermost perimeter of said first ring gear and the second warped portion of the radially outermost perimeter of said second ring gear reducing a horizontal distance periodically between the radially outermost perimeter of said first ring gear and the radially outermost perimeter of said second ring gear.

8. The ring gear set as described in claim 7 wherein the perimeter of said second ring gear includes another warped portion therein and at an angle from the vertical, said another warped portion extending toward a radial outer most perimeter of said third ring gear and reducing the horizontal distance therebetween.

9. The ring gear set as described in claim 8 wherein the perimeter of said third ring gear includes a third warped portion at an angle to the vertical and disposed on the perimeter opposite said second warped portion, said third warped portion extending toward said another warped portion in said second ring gear and reducing the horizontal distance therebetween.

10. The ring gear set as described in claim 7 wherein a maximum deflection of said first warped portion in the perimeter of said first ring gear is in a range of 1/16 to 1/4 inches.

11. The ring gear set as described in claim 7 wherein a maximum deflection of said second warped portion in the perimeter of said second ring gear is in a range of 1/16 to 1/4 inches.

12. The ring gear set as described in claim 8 wherein a maximum deflection of said another warped portion in the perimeter of said second ring gear is in a range of 1/16 to 1/4 inches.

13. The ring gear set as described in claim 9 wherein a maximum deflection of said third warped portion in the perimeter of said third ring gear is in a range of 1/16 to 1/4 inches.

14. A chain ring gear set adapted for attaching to spider arms, the spider arms disposed along a vertical axis, the spider arms attached to and extending outwardly from a bicycle gear crank, the bicycle gear crank disposed along a horizontal axis, the ring gear set is adapted for receiving a bicycle chain thereon, the chain transferred on the ring gear set using a chain derailleur, the ring gear set comprising: a first large ring gear adapted for attachment to the spider arms, a radially outermost perimeter of said first ring gear having a first warped portion at an angle to the vertical and with a degree of arc in a range of 10 to 360 degrees; and a second middle ring gear adapted for attachment to the spider arms, said second ring gear disposed in a spaced relationship to said first ring gear, said first warped portion of the radially outermost perimeter of said first ring gear extending parabolically toward a radially outermost perimeter of said second ring gear thereby reducing a horizontal distance periodically between the radially outermost perimeter of said first ring gear and the radially outermost perimeter of said second middle ring gear.

15. The ring gear set as described in claim 14 further including a second warped portion in the perimeter of said second middle ring gear with a degree of arc in a range of 10 to 360 degrees, said second warped portion extending toward and indexed with said first warped portion in the perimeter of said first ring gear for sharing the amount of warpage periodically between the perimeters of said first and second ring gears and reducing the horizontal distance therebetween.

16. The ring gear set as described in claim 15 farther including another warped portion in the perimeter of said second middle ring gear with a degree of arc in a range of 10 to 360 degree, said another warped portion opposite said second warped portion in the perimeter of said second middle ring gear.

17. The ring gear set as described in claim 15 further including a third small ring gear adapted for attachment to the spider arms, said third ring gear disposed in a spaced relationship to said second ring gear, a radial outer most perimeter of said third small ring gear having a third warped portion therein with a degree of arc in a range of 10 to 360 degrees.

18. The ring gear set as described in claim 17 wherein said third warped portion in the perimeter of said third small ring gear extends toward and indexed with said another warped portion in the perimeter of said second middle ring gear and reducing the horizontal distance therebetween.

* * * * *